Dec. 8, 1970 F. CARASSA ET AL 3,546,608

METHOD AND DEVICE FOR RECOGNIZING AND COMPENSATING PHASE STEPS IN ANGLE DEMODULATORS

Filed May 14, 1968

United States Patent Office 3,546,608

Patented Dec. 8, 1970

3,546,608

METHOD AND DEVICE FOR RECOGNIZING AND COMPENSATING PHASE STEPS IN ANGLE DEMODULATORS

Francesco Carassa and Fabio Rocca, Milan, Italy, assignors, by direct and mesne assignments, to Consiglio Nazionale Delle Ricerche, Piazzale delle Scienze, Rome, Italy, an Italian Government Institute Filed May 14, 1968, Ser. No. 728,989
Claims priority, application Italy, May 22, 1967, 16,348/67
Int. Cl. H03d *3/24*
U.S. Cl. 329—131 3 Claims

ABSTRACT OF THE DISCLOSURE

Method and apparatus for processing the output signal of a phase-lock-loop demodulator of the type including loop means responsive to the loss of locking of a local oscillator relative to the input oscillation for subsequent relocking in a position phase shifted by steps of $2\pi$ radians or multiples thereof. In order to reduce total noise power and to distribute it evenly over the signal band, there is filtered from the demodulator output signal the frequency band below the spectrum of the modulating signal, whereby the occurrence time and amplitude of the transients are determined, and signals having substantially the same occurrence and the same phase are derived, which signals are then inverted in polarity and are added to the output signal from the demodulator to cancel out the noise due to the phase steps.

Figures 1, 2, 3:
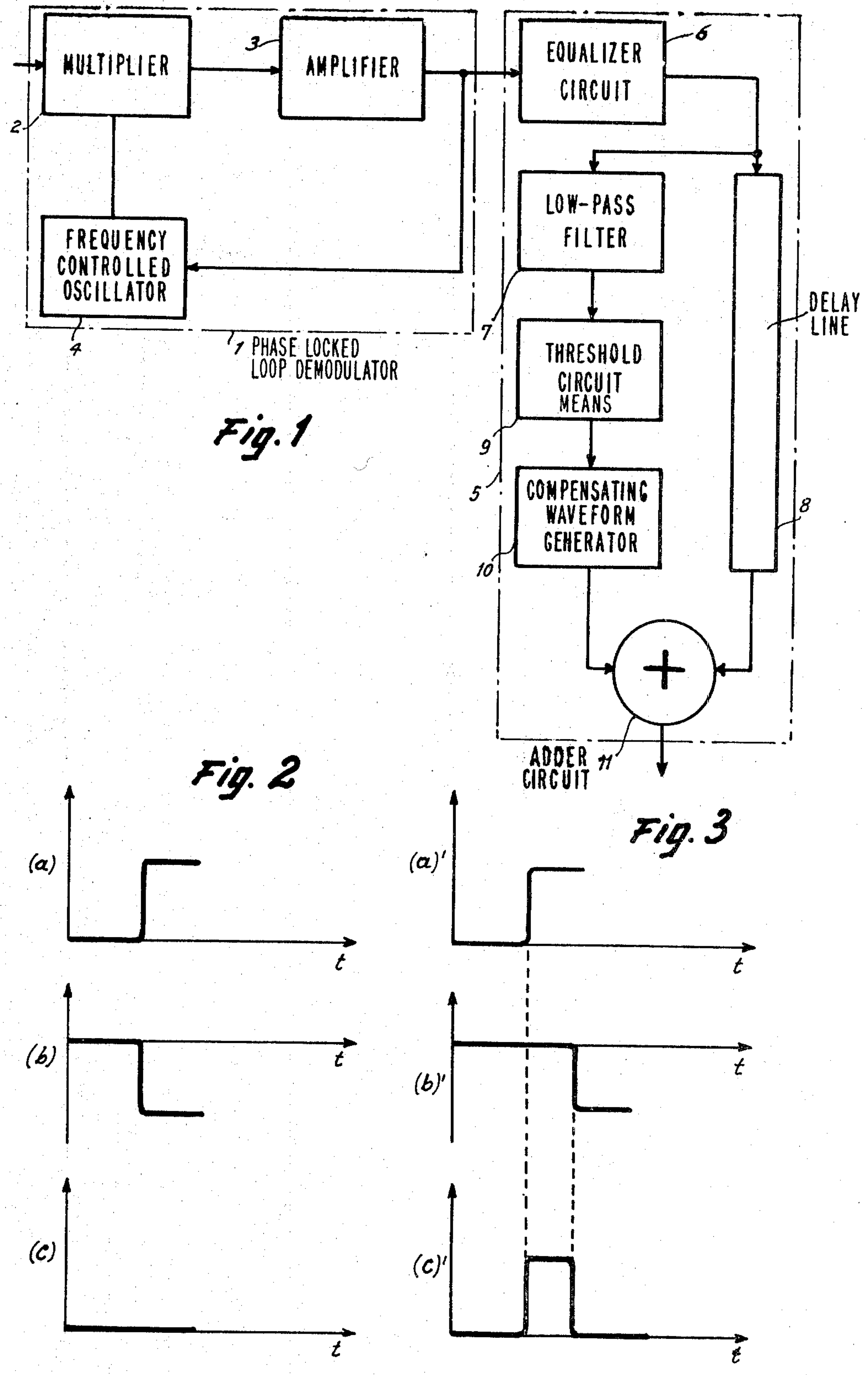

This invention relates to angle demodulators used in angle modulation (i.e. phase or frequency modulation) transmission systems.

It is well known that the signal-to-noise power ratio $\varphi_u$ at the output of an angle modulation transmission system is a function of the carrier wave to noise power ratio $\varphi_i$ at the demodulator input. More particularly the ratio $\varphi_u$ is approximately proportional to $\varphi_i$ until $\varphi_i$ falls below a value $\varphi_{is}$ referred to as the threshold value.

In many applications it is of basical importance to have available demodulators having a $\varphi_{is}$ as low as possible. Since from this point of view the best demodulator known at present is the phase-lock demodulator, the invention will be discussed with reference to this type of demodulator. It should be understood, however, that the invention is not limited to this application but is applicable also to other types of demodulators.

The conditions providing the threshold in a phase-lock loop demodulator occur when the loop error exceeds a predetermined magnitude and consist essentially in two contributions to the degradation of $\varphi_u$, namely (*a*) attenuation of the signal at the multiplier, and (*b*) loss of locking of the local oscillator with respect to the input oscillation with subsequent re-locking in a position which is generally phase shifted by steps of $2\pi$ radians or multiples thereof. For low magnitudes of $\varphi_i$ the contribution (*b*) tends to become dominant. If referring to a simple and common case, it is assumed that the noise at the demodulator input has a spectral density which is constant with the frequency and, for an easier explanation, a pure phase modulation is considered, the noise at the output for $\varphi_i \gg \varphi_{is}$ also has a constant spectral density. For $\varphi_i$ close to $\varphi_{is}$ the deterioration contribution (*a*) does not alter the pattern of the signal and noise spectral densities, whereas the contribution (*b*), since it is a noise consisting in a random sequence of phase steps, has a spectral density which is not constant but is variable approximately in an inverse proportion to the frequency square.

In conclusion, the contribution (*b*) is very important in determining threshold conditions, not only because it highly increments the noise, but also because it increments the noise with a non-uniform spectrum and exactly with a spectrum which is particularly concentrated at low frequencies. The latter aspect is most unfavourable, since, f.i. in the transmission of many frequency division telephone channels, it causes the lower frequency channels to be in a worse condition than the higher frequency channels.

It is an object of this invention to provide a modulation system which reduces the noise contribution (*b*) and evenly distributes the power thereof over the whole signal band.

More particularly it is an object of the invention to provide means for filtering at the demodulator output the frequency band below the spectrum of the modulating signal and for recognizing in said filtered frequency band possible transients due to the phase steps of the demodulator.

According to a feature of the invention conventional threshold means are provided for determining the occurrence time and the amplitude of the transients, and, signals having substantially the same occurrence time and the same phase are derived, whereupon the signals are added with an inverted polarity to the output signal from the demodulator so as to cancel out the noise due to the phase steps.

This device is characterized by the provision of a low-pass filter connected to the demodulator output to generate from the filtered signal a signal compensating the transients due to the phase steps, and an adder circuit connected both to the output of the circuit generating the compensating signal and to the demodulator output.

The invention will be better understood from the following detailed description, taken merely by way of example and therefore in no limiting sense, of an embodiment of the invention, referring to the accompanying drawing in which:

FIG. 1 is a block diagram of a device according to the invention as applied to a phase-lock demodulator, and FIGS. 2 and 3 are two graphs intended to illustrate the operation of the device of FIG. 1.

In FIG. 1 the portion included in the dash line block 1 refers to a conventional phase-lock demodulator. This demodulator includes in a well known manner a multiplier 2, whose output is connected to an amplifier 3 having its output connected to a frequency controlled oscillator 4. The output of the latter is connected to an input of the multiplier 2.

The portion included in the dash line block 5 relates to the device according to the invention. It includes an equalizer circuit 6 having its input connected to the output of the amplifier 3 and having its output connected both to the input of a low-pass filter 7 and the input of a delay line 8. The output of the filter 7 is connected to the input of one or more threshold circuits 9 whose output is connected to the input of a compensating waveform generator 10. The output of the generator 10 is connected to an input of an adder circuit 11 having a second input connected to the output of the delay line.

The described device operates as follows:

Assume that the modulating signal spectrum is included between a minimum frequency $f_m$ and a maximum frequency $f_M$. The filter 7 picks up from the output of the demodulator 1, through the equalizer circuit 6, the frequency band below $f_m$. In this band a noise is normally present to which very well distinguishable transients are added when phase steps occur. The occurrence time and the amplitude of these transients are determined by means of the threshold circuits 9. As to the amplitude it should be noted that it is quantized (since as stated the phase steps can be $\pm\pi$ or multiples thereof) and, therefore, its determination does not involve substantial problems. Once the above said determination is made, the generator 10 is controlled which generates waveforms of the same amplitude and opposite sign with respect to those due to the phase steps and which are applied to the adder 11. To the same adder 11 is also applied the output signal of the delay line 8 whose function is to provide a delay in the output signal of the demodulator 1 to take into account the time required for the phase step recognition and the compensating waveform generation operation.

The noise at the output of the filter 7, while generally does not cause difficulties to the determination of the amplitude of the phase steps, as already stated, causes instead an error in the determination of their occurrence time, so that actually the compensation of the phase steps is not perfect.

In FIG. 2 a graph is illustrated showing at (*a*) a signal caused by a phase step, at (*b*) a compensating waveform and at (*c*) the signal resulting from the addition of the two signals (*a*) and (*b*). This graph illustrates an ideal case wherein the occurrence times of the noise signal due to the phase steps and the compensating waveform are identical whereby a perfect cancellation of the noise is achieved.

In FIG. 3 a graph is illustrated similar to that of FIG. 2, however relating to an actual case. It is seen that the occurrence times of the noise signal (*a*)′ and the compensating waveform (*b*)″ are different whereby, after compensation, a noise (*c*)′ in the form of pulses instead of steps is provided. It can be however readily shown that also under these conditions the improvement which is achieved by the device according to the invention is considerable both because the total noise power is reduced and is evenly distributed over the signal band.

The described method and device are of particular utility in the case of communication systems which have to operate with a minimum transmission power. One example of such systems are the communications by means of satellites.

While but one embodiment of the invention has been illustrated and described, it is obvious that a number of changes and modifications can be made without departing from the scope of the invention.

We claim:

1. Apparatus for processing the output signal of a phase-lock-loop demodulator of the type including loop means responsive to the loss of locking of a local oscillator relative to the input oscillation for subsequent relocking in a position phase shifted by phase steps of $2\pi$ radians or multiples thereof, comprising low-pass filter means (7) for filtering from the demodulator output signal the frequency band (FM) below the spectrum of the modulating signal;

threshold circuit means (9) for determining the time of occurrence and quantized amplitude of the transient signals contained in said filtered frequency band;

compensating waveform generator means (10) for generating waveforms of the same amplitude and opposite sign with respect to those resulting from the phase steps; and means (11) for adding the compensating waveforms to said demodulator output signal to cancel therefrom the noise resulting from the phase steps.

2. Apparatus as defined in claim 1, and further including delay means (8) for delaying the demodulator output signal for a period corresponding with the time required for phase step recognition and generation of the compensating waveforms.

3. Method of processing the output signal of a phase-lock-loop demodulator of the type including means responsive to the loss of locking of a local oscillator relative to the input oscillation for subsequent relocking in a position phase shifted by phase steps of amplitude $2\pi$ radians or multiples thereof, comprising the steps of filtering from a first portion of the demodulator output signal the frequency band (FM) below the spectrum of the modulating signal;

detecting in said low frequency band the time of occurrence and the quantized amplitudes of the transient signals contained in said filtered frequency band;

generating compensating waveforms of the same amplitude and opposite sign relative to those owing to the phase steps;

delaying a second portion of the demodulator output signal; and algebraically adding the compensating waveforms to the delayed demodulator output signal to cancel therefrom the noise resulting from the phase steps.

References Cited

UNITED STATES PATENTS

| | | | |
|---|---|---|---|
| 2,776,410 | 1/1957 | Guanella. | |
| 2,987,701 | 6/1961 | Grannemann | 325—476X |
| 3,199,037 | 8/1965 | Graves | 328—155 |
| 3,324,400 | 6/1967 | Battail et al. | 329—145X |
| 3,351,864 | 11/1967 | Scribner | 329—134X |

ALFRED L. BRODY, Primary Examiner

U.S. Cl. X.R.

325—65, 475; 329—122, 136